JOSEPH T. KUMMER
NEILL WEBER
INVENTOR.

BY John R. Faulkner
Olin B. Johnson
ATTORNEYS

United States Patent Office 3,404,036
Patented Oct. 1, 1968

3,404,036
ENERGY CONVERSION DEVICE COMPRISING A SOLID CRYSTALLINE ELECTROLYTE AND A SOLID REACTION ZONE SEPARATOR
Joseph T. Kummer, Ann Arbor, and Neill Weber, Dearborn, Mich., assignors to Ford Motor Company, Dearborn, Mich., a corporation of Delaware
Continuation-in-part of application Ser. No. 458,596, May 25, 1965. This application May 2, 1966, Ser. No. 563,938
16 Claims. (Cl. 136—6)

ABSTRACT OF THE DISCLOSURE

An energy conversion device having an anodic reaction zone and a cathodic reaction zone and positioned therebetween a solid reaction zone separator comprising a solid crystalline electrolyte that consists essentially of ions of aluminum and oxygen in crystal lattice combination and cations of an alkali metal which migrate in relation to said crystal lattice under influence of an electric field; and a method of generating electrical energy employing said device.

Figure 1:
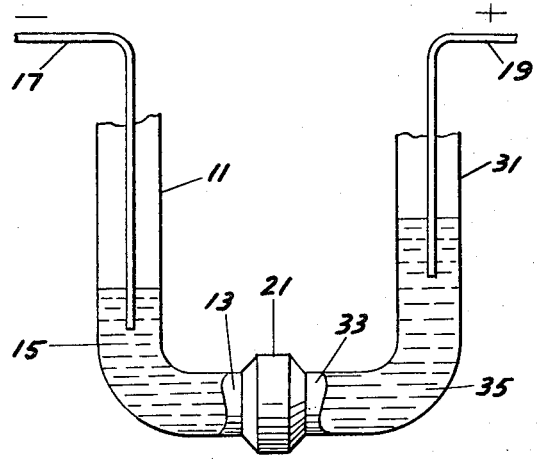

This application is a continuation-in-part of our copending application, Ser. No. 458,596, filed May 25, 1965, now abandoned, which in turn is a continuation-in-part of application Ser. No. 245,047, filed Dec. 17, 1962, and now abandoned.

This invention relates to the conversion of energy. In particular, this invention relates to novel energy conversion devices wherein electrical energy is produced electrochemically and to the novel combination of energy conversion devices of new or conventional structure with a solid electrolyte consisting essentially of ions of aluminum and oxygen in crystal lattice forming combination and second metal cations which migrate in relation to said crystal lattice under influence of an electric field. The solid electrolytes of this invention as used herein provide cationic communication between the anodic and cathodic reaction zones of the energy conversion device and are essentially impermeable to the fluid reactants employed in the device when said reactants are in elemental, compound or anionic state.

One embodiment of this invention is concerned with a primary battery employing electrochemically reactive oxidants and reductants in contact with and on opposite sides of a solid electrolyte of this invention.

Another embodiment of this invention is concerned with a secondary battery employing molten, electrochemically reversibly reactive, oxidants and reductants in contact with and on opposite sides of a solid electrolyte of this invention.

Another embodiment of this invention is concerned with a thermo-electric generator wherein a temperature and pressure differential is maintained between anodic and cathodic reaction zones and/or between anode and cathode and a molten alkali metal is converted to ionic form, passed through a polycrystalline wall or inorganic membrane of the aforementioned solid electrolyte and reconverted to elemental form.

Another embodiment of this invention is concerned with a thermally regenerated fuel cell utilizing a solid electrolyte of this invention.

Another embodiment of this invention is concerned with a method of separating a liquid metal from a liquid salt thereof by electrofiltering such metal through the cationically conductive solid electrolyte of this invention.

Beta-alumina or sodium beta-alumina is a material conventionally represented by the formula $Na_2O \cdot 11Al_2O_3$ and may be thought of as a series of layers of $Al_2O_3$ held apart by columns of linear Al—O bond chains with sodium ions occupying sites between the aforementioned layers and columns. It is widely used in the manufacturing of refractory bricks for lining furnaces subject to corrosion from a basic melt and/or slag.

It now has been discovered that bimetal oxides having the beta-alumina type crystalline lattice make effective cell separators and/or solid electrolytes for use in energy conversion devices, particularly those employing molten metals and/or molten metal salts as reactants. The sodium containing embodiment of these crystalline oxides includes, but is not limited to, the sodium oxide concentration corresponding to $Na_2O \cdot 11Al_2O_3$. Where the sodium oxide concentration in the reactants employed to form this crystalline oxide is less than that of beta-alumina, corresponding amounts of $Al_2O_3$ will be distributed through the product. Likewise, where the sodium oxide concentration is greater than that of beta-alumina, corresponding amounts of $NaAlO_2$ will be distributed through the crystalline material. These materials reduce conductivity in the areas wherein they appear and are advantageously minimized. The sodium ions of the bimetal oxide may be replaced with other positive ions as hereinafter illustrated. The monovalent cations of other alkali metals are the preferred replacements for sodium when the material is to be used as a solid electrolyte in the generation of electrical energy. In the use of the crystalline oxide in a cell for the separation of a molten metal from a metal salt thereof, the metal from which the migratory ion is derived may be sodium, another alkali metal, or derived from other metals which for a variety of reasons would not be practical replacements for sodium in a device for generating electrical energy.

It will be understood that when polycrystalline objects, e.g. slabs, tubes, envelopes, etc., are used as cation selective transfer means between two reaction zones of an energy conversion device which are otherwise separated by said objects, as illustrated hereinafter in detailed description of a variety of energy conversion devices, the migratory ion of the bimetal oxide is replaced by the cations being transferred therethrough. In the cells hereinafter described, the bimetal oxide cell separator which is selectively cationic-conductive prevents the nonionic transfer of reactants, i.e. elements or compounds, between anodic and cathodic reaction zones. In the illustrated embodiments employing liquid electrolyte-reactants, the solid electrolytes of this invention are also impermeable to anions of the electrolyte-reactant. The solid electrolyte of these cells also provides an effective barrier to electron flow.

The use of solid electrolytes in energy conversion devices for the generation of electrical energy is well known in the art. See, for example, Galvanic Cells With Solid Electrolytes Involving Ionic and Electronic Conduction, C. Wagner, Department of Metallurgy, Massachusetts Institute of Technology, pp. 361–377, in International Committee of Electrochemical Thermodynamics and Kinetics, Proceedings of the Seventh Meeting at Lindau 1955, Butterworth Scientific Publications, London, England, 1957, and Solid Electrolyte Fuel Cells, J. Weissbart and R. Ruka, Fuel Cells, G. J. Young, editor, Reinhold Publishing Corporation, New York, N.Y., 1963.

Figure 2:
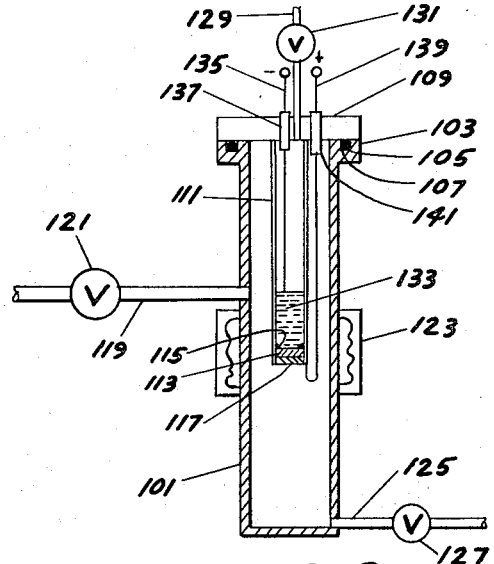
Figure 3:
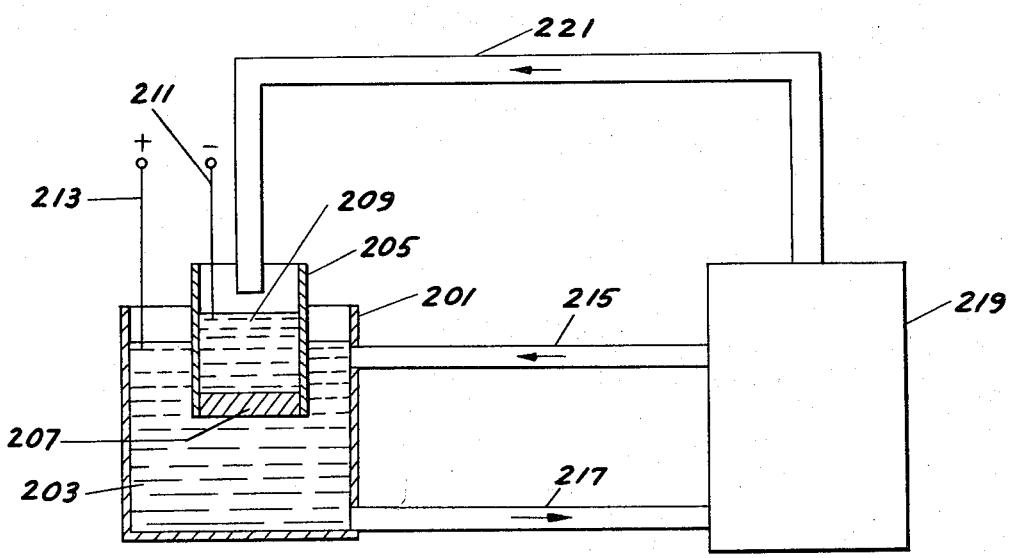

The accompanying drawing schematically illustrates typical alternative embodiments in which the cell separators or solid electrolytes of this invention may be used. In the drawing:

FIGURE 1 illustrates a simple cell wherein a solid electrolyte of this invention provides cationic communication between and otherwise separates a liquid reactant-anode and a liquid reactant-electrolyte which is in contact with a conventional cathode;

FIGURE 2 illustrates the use of a solid electrolyte of this invention in a primary battery, i.e. a thermoelectric generator wherein heat is converted to electrical energy utilizing a pressure differential between the anodic and cathodic sides of the solid electrolyte; and FIGURE 3 illustrates the use of a solid electrolyte of this invention in another embodiment of a primary battery, i.e. a thermally regenerated fuel cell.

Slabs of polycrystalline sodium beta-alumina suitable for use in this invention may be fabricated by any of the following methods:

(1) In a first method commercially available beta-alumina refractory bricks are ground and/or milled to a powder the particles of which are less than about 1, preferably not significantly greater than about ⅓ micron, in maximum diameter. To the resulting powder is added $Na_2CO_3$ or $Al_2O_3$ powder of like size, if necessary to bring the concentration of $Na_2O$ to about 5 to 6 wt. percent of the mixture, and hence to provide near stoichiometric composition for $Na_2O \cdot 11Al_2O_3$. The powder is pressed into pellets at pressures of about 9,000 p.s.i. or greater, e.g. pellets of about ¾-inch diameter, ½-inch length and a green density of about 1.98 gm./cm.$^3$. Pressures up to about 110,000 p.s.i. have been successfully employed. Sintering of the pellets is carried out in an enclosed platinum-rhodium crucible, in the presence of a coarse powder of beta-alumina, i.e. particles of above 1 micron diameter, at a temperature in the range of about 2900° F. to about 3300° F. (about 1593° C. to about 1816° C.) for a time in the range of about 5 minutes to about 1 hour. The sintered pellet has a density of about 3.0 gm./cm.$^3$ and is sliced into thin slabs, e.g. with diamond saw, or the slabs may be formed originally to use size. These materials are also sintered and formed into tubes which in addition to serving as solid electrolytes also serve as containers for a reactant in elemental or compound form. They provide high area per unit volume when immersed in another reactant. The ionic conductivity of this material at 300° C. is about $1.5 \times 10^{-2}$ (ohm-cm.)$^{-1}$ or higher. The aforementioned stoichiometric composition, although preferred, may be varied within limits. For instance, tests have shown that when the $Na_2O$ concentration is as low as 3.25 wt. percent or as high as 10 wt. percent, the ionic conductivity of the alumina produced therefrom still exists but is about ⅓ of that of a slab of $Na_2O \cdot 11Al_2O_3$, probably due to the formation of some $Na_2O \cdot Al_2O_3$ ($NaAlO_2$) in the case of the excess and some $Al_2O_3$ where insufficient sodium is present. The sodium oxide concentration is preferably maintained in the range of about 8 to about 12 mol. percent. Industrial quality beta-alumina bricks contain minor amounts of $SiO_2$. Test results demonstrate that this material adversely affects the electrical properties of the slabs with time in cell use. Hence, a beta-alumina having the lowest possible concentration of $SiO_2$ is preferred.

(2) In a second method, powders of $Na_2CO_3$ and $Al_2O_3$ are mixed in such proportion as to provide a mixture equivalent to 60 wt. percent $NaAlO_2$ and 40 wt. percent $Na_2O \cdot 11Al_2O_3$. This mixture is heated to about 2900° F. (about 1593° C.) and forms a molten eutectic which when cooled to room temperature yields a product made up of particles of sodium beta-alumina imbedded in $NaAlO_2$. The $NaAlO_2$ is dissolved in water leaving the powdered sodium beta-alumina which is then ground and/or milled and sintered as in the previous method. Slabs prepared in this manner have demonstrated an ionic conductivity of about $3 \times 10^{-2}$ (ohm-cm.)$^{-1}$ at 300° C. and about $1 \times 10^{-3}$ (ohm-cm.)$^{-1}$ at 25° C. and were found to be impermeable to helium at 25° C., i.e. a detectable leakage of helium therethrough was not detectable by a standard laboratory leak detector (Consolidated Electrodynamics Corp.—Leak Detector No. 24–120).

(3) In a third method, sodium beta-alumina slabs of improved resistance to chemical attack by molten sodium are produced as in either of the previously described methods with the single difference that to the powdered beta-alumina there is added about 0.1 to about 1 wt. percent $B_2O_3$. While the slabs prepared in this manner demonstrate a greater resistance to attack by molten sodium, they demonstrate somewhat lower conductivity characteristics. Typical slabs prepared in this manner and starting with commercial brick grade beta-alumina demonstrated conductivities in the order of $10^{-2}$ to $0.5 \times 10^{-2}$ (ohm-cm.)$^{-1}$.

Cationically conductive polycrystalline solid electrolytes are prepared by substituting other alkali metals for sodium. Various methods are available for preparing the sodium-substituted beta-alumina type electrolytes consideration being given to the size of the substituted ion in relation to the sodium ion. Three such methods are illustrated in the following examples which illustrate some of the uses for the solid electrolytes of this invention.

EXAMPLE 1

Referring now to FIGURE 1, a single cell secondary battery is constructed of glass tubes 11 and 31, a slab of sodium beta-alumina 21 separating tubes 11 and 31 and affixed thereto in liquid-tight relationship by glass seals 13 and 33. The tubes 11 and 31 have an internal diameter of about 12 mm. These and the glass seals 13 and 33 are constructed of a glass having a coefficient of expansion close to that of beta-alumina, e.g. Corning 7052, Kovar. The tube 11 is partially filled with molten sodium 15 and tube 31 is filled with a molten sodium and sulfur containing reactant such as sodium pentasulfide ($Na_2S_5$) 35. The sodium and $Na_2S_5$ are maintained in molten state by conventional heating means not shown. The air in tubes 11 and 31 may be essentially evacuated and the tubes sealed or the cell may be operated in an inert atmosphere, e.g. argon. The beta-alumina slab 21 is about 12 mm. in diameter and about 2 mm. thick with the face exposed to the reactants in each of the tubes 11 and 31 being about 1.13 cm.$^2$, assuming a completely flat surface. All other areas hereinafter recited are measured on this basis which may be termed the geometric area.

In this cell the molten sodium serves both as the anodic reactant and as an electrode while the sodium and sulfur reactant serve both as the cathodic reactant and as a liquid electrolyte which is in contact with the electrode 19. Ordinarily one would start the reaction with the cathodic reactant having a sodium to sulfur ratio of about 2:5 and terminate the cell discharge when this ratio is at least about 2:3. A copper wire lead 17 extending into the sodium electrode 15 and a stainless steel electrode 19 extending into the sodium pentasulfide 35 illustrate ends of an external circuit, not further shown, which may include a voltmeter, ammeter, etc. In the discharge half-cycle of this cell, the sodium is attracted to the sulfur opposite the beta-alumina membrane, gives up an electron, passes through the membrane as a sodium ion and combines with a sulfide ion formed at the cathode 19 with acceptance of an electron, thus causing an electric current to flow through the aforementioned external circuit. Recharging is effected by impressing an external source of electric power upon the circuit with a reverse electron flow in relation to that of the discharge half-cycle.

The open circuit voltage of the cell above described is about 2 volts. At a temperature of about 312° C., this cell demonstrates the following charge-discharge characteristics:

| Discharge | | Charge | |
| --- | --- | --- | --- |
| E[1] | I[2] | E[1] | I[2] |
| 2.1 | 0 | 2.1 | 0 |
| 1.75 | 10 | 2.45 | 10 |
| 1.42 | 20 | 2.77 | 20 |
| 1.1 | 30 | 3.14 | 30 |
| .84 | 40 | 3.45 | 40 |
| .38 | 60 | 4.1 | 60 |

[1] Volts.  [2] Milliamperes.

A cell as above described with the sodium beta-alumina slab 21 prepared from powdered commercially available beta-alumina bricks as hereinbefore described, first method of fabrication, is subjected to a life test consisting of ½ hour charge and discharge cycles at a temperature of about 312° C. An increase in the internal resistance of the cell by a factor of 2 is demonstrated after 360 hours. The test is repeated with a cell that is identical to the cell used in the previous test except that the beta-alumina slab is prepared from commercial grade beta-alumina bricks with 0.5 wt. percent $B_2O_3$ added as hereinbefore described, third method of fabrication. The change of internal resistance with time is observed as follows.

| Time (hours): | Internal resistance using $B_2O_3$ modified beta-alumina electrolyte (ohm) |
|---|---|
| 0 | 32 |
| 190 | 26 |
| 360 | 24 |
| 425 | 22 |

| Glass cracked: | Cell resealed |
|---|---|
| 0 | 47 |
| 240 | 37 |
| 408 | 32 |
| 460 | 31 |
| 575 | 27 |

A cell of the type used in the previous tests and having a beta-alumina slab electrolyte prepared from the eutectic formed from $Na_2CO_3$ and $Al_2O_3$ esentially as hereinbefore described, second method of fabrication, is tested at 295° C. to determine its charge-discharge characteristics as in the previous tests. The particle size prior to sintering is about 0.16 micron. The green pellets are sintered at 3250° F. for 5 minutes in a closed container in the presence of a coarse powder of sodium beta-alumina. The slab used in this cell is about 2.8 mm. in thickness and presents a 1.5 cm.² face to each reactant. The $Na_2O$ content of the finished slab is about 5.75 wt. percent (about 9.1 mol. percent). The $SiO_2$ content is about 0.05 wt. percent. The charge-discharge characteristics of this cell are observed as follows:

| Discharge | | Charge | |
|---|---|---|---|
| E[1] | I[2] | E[1] | I[2] |
| 1.95 | 0 | 1.95 | 0 |
| 1.80 | 20 | 2.06 | 10 |
| 1.62 | 40 | 2.40 | 50 |
| 1.13 | 100 | 2.61 | 75 |
| 0.30 | 200 | | |

[1] Volts. [2] Milliamperes.

Further tests are made of beta-alumina electrolytes prepared by the various methods hereinbefore described to ascertain the electrical resistance of the slabs at various temperatures and the following results are observed:

(1) Sodium beta-alumina slabs are prepared from the eutectic as hereinbefore described (second method of fabrication). The beta-alumina powder prior to sintering has an average particle size of about 0.16 micron. Sintering is carried out at about 3285° F. for about ½ hour. The resulting pellet has a density of about 3.05 gm./cm.³ and contains about 5.75 wt. percent (about 0.1 mol. percent) $Na_2O$ and about 0.05 wt. percent $SiO_2$, with a remainder essentially all $Al_2O_3$.

| Temperature: | Resistivity (ohm-cm.) |
|---|---|
| 25 | 750 |
| 100 | 168 |
| 150 | 88.0 |
| 200 | 52.0 |
| 300 | 27.5 |
| 400 | 18.5 |

(2) $B_2O_3$ modified sodium beta-alumina slabs are prepared from commercial grade beta-alumina as hereinbefore described (third method of fabrication). The beta-alumina powder prior to sintering has an average particle size of about ⅓ micron. Sintering is carried out at about 3025° F. for about ½ hour. The resulting pellet has a density of about 3.01 gm./cm.³ and contains about 6.37 wt. percent $Na_2O$ (about 10.1 mol. percent), 0.69 wt. percent $SiO_2$, between 0.5 and 1.0 wt. percent $B_2O_3$, with a remainder essentially all $Al_2O_3$.

| Temperature: | Resistivity (ohm-cm.) |
|---|---|
| 25 | 22,000 |
| 100 | 4,200 |
| 150 | 1,300 |
| 200 | 500 |
| 300 | 200 |
| 400 | 90 |

(3) $B_2O_3$ modified sodium beta-alumina slabs are prepared from the eutectic as hereinbefore described (second method of fabrication) with $B_2O_3$ added as hereinbefore described (third method of fabrication). The beta-alumina powder prior to sintering has an average particle size of about 0.16 micron. Sintering is carried out at about 3274° F. for about 40 minutes. The resulting pellet has a density of about 3.02 gm./cm.³ and contains about 5.75 wt. percent $Na_2O$ (about 9.1 mol. percent), about 0.04 wt. percent $SiO_2$ and about 0.16 wt. percent $B_2O_3$, remainder essentially all $Al_2O_3$.

| Temperature: | Resistivity (ohm-cm.) |
|---|---|
| 25 | 7,900 |
| 100 | 1,500 |
| 150 | 570 |
| 200 | 240 |
| 300 | 70 |

(4) Sodium beta-alumina slabs are prepared from a commercial brick of low $SiO_2$ content as hereinbefore described (first method of fabrication). The average particle size before sintering is about ⅓ micron. Sintering is carried out at about 3139° F. for 40 minutes. The resulting pellet has a density of about 3.09 gm./cm.³ and contains about 4.78 wt. percent $Na_2O$ (about 7.71 mol. percent) and about 0.3 wt. percent $SiO_2$.

| Temperature: | Resistivity (ohm-cm.) |
|---|---|
| 25 | 5,900 |
| 100 | 2,400 |
| 150 | 570 |
| 200 | 190 |
| 300 | 59 |

An operation of this type of cell is carried out as previously described except for the following changes: the positive lead 19 is connected to a chromium-iron alloy screen immersed in the oxidant, the beta-alumina slab has an exposed face to each reactant of 0.64 cm.² and a thickness of 2 mm., the oxidizing agent 35 consists of 75 wt. percent sulfur and 25 wt. percent graphite, and the cell is heated to about 309° C. This cell displays the following output characteristics:

Initial discharge current—54 milliamperes on short circuit.

Short circuit current—80 milliamperes after about 240 milliampere-hours.

Short circuit current—120 milliamperes after about milliampere-hours discharge.

The charge-discharge characteristics of the cell are then measured and the following results obtained:

| Discharge | | Charge | |
|---|---|---|---|
| E[1] | I[2] | E[1] | I[2] |
| 2.1 | 0 | 2.1 | 0 |
| 1.80 | 20 | 2.38 | 19 |
| 1.73 | 25 | 2.51 | 28 |
| 1.53 | 38 | 2.90 | 51 |
| 1.20 | 60 | 3.11 | 65 |
| 0.83 | 83 | 3.50 | 87 |
| 0.23 | 115 | 4.0 | 116 |

[1] Volts. [2] Milliamperes.

An operation of this type of cell is carried out as previously described except for the following changes: the positive lead 19 is connected to a copper screen immersed in the oxidant, the beta-alumina slab has an exposed face to each reactant of 1.3 cm.$^2$ and a thickness of 2 mm., the oxidizing agent 35 consists of $AlCl_3$, NaCl and CuCl in a 1:0.5:0.5 molar ratio. The cell heated to 200° C. exhibits an open circuit potential of 2.9 volts and a short circuit current of about 20 milliamperes.

A cell is prepared consisting of a glass vessel in which a sandwich consisting of a center of 50 wt. percent Na-50 wt. percent Hg amalgam is held between two beta-alumina plates 2.5 cm. wide and 3.5 mm. thick. The plates are positioned about 1/16 inch apart. A platinum wire negative lead is inserted into the amalgam. The perimeters of the plates are sealed with glass, e.g. Corning 7052. The oxidant is 70 mol. percent of $ZnCl_2$ and 30 mol. percent NaCl. The sandwich is immersed into the oxidant to a depth of 5 cm. A Zn wire electrode comprising the positive lead is immersed in the oxidant. The cell is operated at 340° C. and demonstrates the following electrical output characteristics:

| Current:[1] | Potential[2] |
|---|---|
| 0 | 2.22 |
| Charge 540 | 4.6 |
| Discharge 680 | [3]~0 |

[1] Milliamperes. [2] Volts. [3] Short circuit.

Beta-alumina of low silica content sintered to a high density has been prepared which has a resistivity of as low as 500 ohm-cm. at room temperature.

Lithium substituted beta-alumina slabs are prepared by first preparing sodium beta-alumina slabs of about 2 mm. thickness in accordance with the aforedescribed methods. The sodium beta-alumina slabs are then immersed overnight in liquid silver nitrate under an argon blanket and thence removed from the bath. The resulting silver substituted sodium beta-alumina slabs are immersed overnight in liquid lithium chloride under an argon blanket. The resulting lithium substituted beta-alumina slabs are then ready for use as a solid electrolyte in an energy conversion device of the types herein described.

Potassium substituted beta-alumina slabs are prepared in accordance with the methods hereinbefore described for preparing sodium beta-alumina using potassium carbonate in lieu of sodium carbonate.

In an alternative method, potassium substituted beta-alumina slabs are prepared by first preparing powdered sodium beta-alumina as in the preceding examples, immersing the powdered sodium beta-alumina in excess potassium nitrate until substitution of potassium for sodium takes place, e.g. overnight. The resulting potassium substituted beta-alumina powder is then pressed and sintered as in the preceding examples. The resulting slabs are then ready for use as solid electrolytes in an energy conversion device of the types herein described.

Rubidium substituted beta-alumina is prepared in accordance with the methods hereinbefore described for preparing sodium beta-alumina. The powdered rubidium beta-alumina may be pressed and sintered into slabs as in the preceding examples or employed as an intermediate for preparing other beta-alumina type materials via ion substitution. It will be understood by those skilled in the art that the foregoing examples are exemplary both as to method and materials.

A cell constructed and arranged in the manner of the cell illustrated in FIGURE 1 is operated with a potassium substituted beta-alumina solid electrolyte, indicated in FIGURE 1 by the numeral 21. The anodic reactant of this cell is molten potassium and the cathodic reactant is molten sulfur and graphite powder, e.g. 75 wt. percent sulfur and 25 wt. percent graphite.

A cell constructed and arranged in the manner of the cell illustrated in FIGURE 1 is operated with a lithium substituted beta-alumina solid electrolyte. The anodic reactant of this cell is molten lithium and the cathodic reactant is again sulfur and graphite.

A cell constructed and arranged in the manner of the cells illustrated in FIGURES 1 and 2 of the drawing are operated with a eutectic mixture of two alkali metals, e.g. sodium and potassium, as the anodic reactant. The cathodic reactant is initially molten sulfur and graphite powder.

Conventional storage batteries use solid electrodes and a liquid electrolyte. Their operation is impaired by the inability to maintain the dimensional tolerances of the electrodes during repeated charge and discharge cycles. Using sodium beta-alumina, or substituted beta-alumina with sodium replaced by other alkali metal, as the solid electrolyte and reactant separator, liquid anodes and liquid cathodic reactants can be employed thereby eliminating dimensional change problems. Furthermore, since the conductivity of beta-alumina and the other bimetal oxide solid electrolytes herein comes about by purely ionic motion through an atomic lattice, the electrolyte cannot be shorted out by the growth of small metallic bridges between the electrodes.

EXAMPLE 2

Referring now to FIGURE 2 of the drawing, there is shown a stainless steel vessel 101, e.g. about 1 inch in internal diameter and 11 inches in length. Tube 101 has a flange 103 at its open end. Flange 103 is provided with a groove or channel 105 in which rests a rubber O-ring 107 which provides a vacuum-tight seal when the stainless steel cover plate 109 is secured to tube 101 by thread, bolt or other conventional attaching means, not shown. Positioned inside tube 101 and affixed to cover plate 109 is a smaller tube 111, e.g. about 1/2-inch in internal diameter and 6 inches in length. The lower end of tube 111 is closed by a circular plate of sodium beta-alumina 113. The vacuum-tight glass seals 115 are provided to secure plate 113 to tube 111 and prevent passage of fluids between plate 113 and tube 111. The lower edge of plate 113 is provided with a thin conducting layer of platinum brite paint 117, e.g. platinum chloride in an organic reducing agent, which in FIGURE 2 is shown disproportionally thick in relation to the other components to facilitate its location and identification. In practice, this platinum layer is porous enough to permit sodium vapor to pass therethrough and sufficiently thick and continuous to conduct electricity.

Tube 101 is provided with an outlet conduit 119 having a valve 121. A vacuum pump, not shown, is connected to conduit 119 for reducing the pressure in tube 101.

Tube 101 is further provided with a heating element 123 and an outlet conduit 125 with valve 127 for removing liquid from tube 101.

An inlet conduit 129 and valve 131 provide means for introducing a liquid into tube 111.

In the embodiment wherein plate 113 is of sodium beta-alumina, tube 111 is partially filled with molten sodium 133. A copper wire negative lead 135 to an external circuit, not shown, extends through an insulator 137 and into the molten sodium 133. Insulator 137 extends through cover 109. A copper wire positive lead 139 to the external circuit passes through an insulator 141 which extends through cover plate 109 and is in electrical connection with the film of platinum 117. In the alternative, lead 135 may be connected directly to tube 111 where tube 111 is a good conductor.

In the operation of this cell, heat is converted directly to electrical energy. Tube 101 is evacuated by pumping means through conduit 121 to a pressure lower than about 0.1 mm. Hg and then sealed. Sodium 133 in tube 111 is heated to a temperature of 300° C. or greater while the lower end of tube 101 is maintained at approximately 100° C. by the ambient room temperature. A difference in sodium vapor pressure on the two sides of the beta-alumina plate 113 results in the operation of a difference of electrical potential across the plate. As electrons flow through the external circuit, sodium 133 passes through plate 113 as sodium ions accepting an electron from the platinum electrode 117 and returning to elemental state.

Since the lower part of tube 101 is maintained at the relatively low temperature of about 100° C. the sodium condenses here and the pressure in the outer tube 101 becomes the vapor pressure of sodium at about 100° C. modified by any pressure drop produced by the mass flow of sodium vapor from the platinum 117 to the cooler walls of the outer tube 101.

One advantage of this thermo-electric generator is that the hot and cold parts can be separated to almost arbitrary distances thereby minimizing the effects of wasted heat conduction between the hot and cold parts. In continuous operation the condensed sodium in the bottom of tube 101 is heated and returned to the hot zone in tube 111.

The cell just described is operated with the sodium 133 in tube 111 heated to 350° C., 406° C. and 448° C., respectively, and generates electrical energy as below set forth:

| Voltage | Current (milliamperes) | | |
|---|---|---|---|
| | 350° C. | 406° C. | 448° C. |
| 0.1 | 2.9 | 7.9 | 12.7 |
| 0.2 | 1.7 | 5.5 | 9.7 |
| 0.3 | 0.7 | 3.4 | 7.0 |
| 0.4 | 0.0 | 1.5 | 4.7 |
| 0.5 | 0.0 | 0.5 | 2.5 |
| 0.6 | 0.0 | 0.0 | 0.9 |

Plate 113 is converted to potassium substituted beta-alumina as hereinbefore described and potassium is employed in lieu of sodium in tube 111. The potassium in tube 111 is maintained at a temperature above the melting point of potassium.

Plate 113 is converted to lithium substituted beta-alumina as hereinbefore described and lithium is employed in lieu of sodium in tube 111. The lithium in tube 111 is maintained at a temperature above the melting point of lithium.

EXAMPLE 3

Referring now to FIGURE 13, there is shown in sectional view, a vessel 201 containing molten tin 203. Extending into the molten tin 203 is a smaller vessel 205, also shown in sectional view, with the lower end closed with a sodium beta-alumina plate 207 and a glass seal, not shown. In operation, vessels 201 and 205 are closed at their upper ends and/or blanketed with an inert gas. Vessel 205 contains molten sodium 209. Conductor 211 is a negative lead to an external circuit, not further shown, and extends into the molten sodium while a positive lead, conductor 213, extends into the molten tin.

Vessel 201 is in fluid communication with a decomposition chamber 219 via an upper conduit 215 and a lower conduit 217. Decomposition chamber 219 is in fluid communication with vessel 205 via overhead conduit 221 and is provided with heating means, not shown.

This device converts heat into electrical energy. The sodium ions in plate 207 are attracted to the molten tin in vessel 201 and the contents of this vessel are then represented by the formula $NaSn_x$. Sodium atoms 209 release electrons to lead 211 and as ions replace the sodium ions attracted from plate 207 to the tin 203. Such electrons are returned via the external circuit and lead 213 to be accepted in the formation of $NaSn_x$ in vessel 201. The reaction product $NaSn_x$ passes via conduit 217 to decomposition chamber 219 and s heated to decomposition temperature. Sodium vapor passes overhead from decomposition chamber 219 to vessel 205 via conduit 221 while molten tin is returned to vessel 201 via conduit 215.

Primary batteries have been disclosed employing filter means to restrain the flow of a molten metal electrode-anodic reactant into a liquid electrolyte which is, contains, or is in contact with a cathodic reactant, the anodic reactant contacting the liquid electrolyte in elemental state. The cathodic half-cells of such batteries are described as being capable of thermal and/or chemical regeneration. Due to contact of the anodic reactant in elemental state with the liquid electrolyte and the absence of a cationically conductive separator through which the anodic reactant can be separated from the electrolyte by cationic transfer, such cells are not adapted for electrical recharging. Ion permeable membranes heretofore employed in other cells have proven susceptible to chemical attack and subsequent mechanical failure or plugging. Chemically resistant glasses such as the preferred glasses disclosed in our copending application, Ser. No. 507,624, filed Oct. 22, 1965, provided the best combination of ion conductivity and chemical resistance to alkali metals and salts thereof known to us prior to this invention.

EXAMPLE 4

The sodium beta-alumina and cation substituted beta-alumina plates of this invention are further used to produce elemental metal of exceedingly high purity from an ionizable compound of the metal sought to be recovered. In this use the beta-alumina serves as an ion filter through which an impressed voltage and resultant current flow drives the ion to be recovered as elemental metal.

Using a cell such as that shown in FIGURE 1, a molten $NaNO_3$-$NaNO_2$ eutectic mixture at 245° C. is placed in the tube corresponding to 31 of FIGURE 1. The sodium beta-alumina slab corresponding to 21 of FIGURE 1 serves as the ion filtering device. A small amount of molten sodium is placed in the tube corresponding to 11 of FIGURE 1 and a direct current from a direct electric current power source connected with the external circuit is passed through the cell via leads corresponding to 17 and 19 of FIGURE 1. The impressed potential is controlled so as to make lead 17 more negative than the open circuit voltage of the cell. Sodium ions leave the mixture, pass through the beta-alumina plate and are converted to elemental sodium.

Separation of other metals from ionizable compounds thereof can be effected in like manner using substituted beta-alumina type crystalline separators hereinbefore exemplified.

In one preferred embodiment, aluminum metal or a suitable alloy thereof is used as the cell containers and structural components in the energy conversion devices of this invention. In such use, an insulator is employed between the aluminum and the aforedescribed solid electrolytes.

The term "glass" as employed herein means an inorganic product of fusion which has cooled to a rigid condition without crystallizing. See A.S.T.M. C-162-45 T.

The terms "crystal" and "crystalline" as employed herein exclude glass and are generic with respect to "single crystal," "monocrystal" and "polycrystalline."

The term "polycrystalline" as employed herein refers to a plurality of single crystals bound together by sintering or other suitable means to form a cationically conductive object.

The term "cationically conductive separator" as employed herein means an object containing cations which migrate therein upon application of a difference of electrical potential on opposite sides thereof which is sufficient to overcome all other forces acting thereon and through which said cations can be passed upon application of said difference of electrical potential but which is impermeable to elemental alkali metal and compounds thereof.

It is to be understood that this invention is not limited to the examples herein shown and described, but that changes and modifications may be made within the spirit and scope of the invention as defined in the appended claims.

We claim:

1. In an energy conversion device having an anodic reaction zone and a cathodic reaction zone enclosed and positioned to admit of being in cationic communication with each other, conduction means in electrical communication with said anodic reaction zone, and conduction means in electrical communication with said cathodic reaction zone, the improvement in combination therewith comprising a solid reaction zone separator positioned between said anodic reaction zone and said cathodic reaction zone, said separator comprising a solid crystalline electrolyte that consists essentially of ions of aluminum and oxygen in crystal lattice combination and cations of an alkali metal which migrate in relation to said crystal lattice under influence of an electric field.

2. An energy conversion device in accordance with claim 1 wherein at least 84 mol percent of said solid crystalline electrolyte is formed from an oxide of aluminum and about 4 to about 16 mol percent is formed from an oxide of said alkali metal which have been heated together to crystal forming temperature.

3. An energy conversion device in accordance with claim 1 wherein said cations are sodium ions and wherein about 88 to about 92 mol percent of said solid crystalline electrolyte is formed from an oxide of aluminum and about 8 to about 12 mol percent from an oxide of sodium which have been heated together to crystal forming temperature.

4. An energy conversion device in accordance with claim 1 wherein about 0.1 to about 1.0 wt. percent of said solid crystalline electrolyte is formed from boron oxide which has been heated together with said oxide of aluminum and said oxide of sodium to crystal forming temperature.

5. A secondary battery for generating electrical energy electrochemically which comprises an enclosed anodic reaction zone, an alkali metal anodic reactant in said anodic reaction zone, an enclosed cathodic reaction zone, a cathode in said cathodic reaction zone, a cathodic reactant-electrolyte in said cathodic reaction zone that is electrochemically reversibly reactive with cations of said alkali metal and in contact with said cathode, conduction means in electrical connection with said anodic reactant, conduction means in electrical connection with said cathode, and a solid half-cell separator positioned between and in communication with said anodic reaction zone and said cathodic reaction zone that separates said anodic reactant and the anodic half-cell reactions thereof from said cathodic reactant-electrolyte and the cathodic half-cell reactions thereof, said separator comprising a solid crystalline electrolyte that consists essentially of ions of aluminum and oxygen in crystal lattice combination and cations of an alkali metal which migrate in relation to said crystal lattice under influence of an electric field.

6. In an energy conversion device wherein electrical energy is produced electrochemically comprising
   (1) container means
      (a) substantially enclosing an anodic reaction zone,
      (b) substantially enclosing a cathodic reaction zone positioned to admit of being placed in cationic communication with said anodic reaction zone,
      (c) having inlet means through which an alkali metal anode-reactant can be introduced into said anodic reaction zone, and
      (d) having inlet means through which a liquid cathodic reactant-electrolyte can be introduced into said cathodic reaction zone,
   (2) molten alkali metal anode-reactant within said anodic reaction zone,
   (3) a liquid cathodic reactant-electrolyte within said cathodic reaction zone that is electrochemically reactive with said anode-reactant, and
   (4) a cathode in said cathodic reaction zone in contact with said cathodic reactant-electrolyte,
the improvement in combination therewith consisting of a reaction zone separator interposed between said anodic reaction zone and said cathodic reaction zone and in contact with said anode-reactant and said cathodic reactant-electrolyte, said reaction zone separator being impermeable to said anode-reactant when said anode-reactant is in elemental state, impermeable to said cathodic reactant-electrolyte, permeable to cations of said anode-reactant, and comprising a crystalline, solid electrolyte consisting essentially of ions of aluminum and oxygen in crystal lattice combination and cations of said alkali metal which migrate in relation thereto under influence of an electric field.

7. An energy conversion device in accordance with claim 6 which is a primary battery and said cathodic reaction zone has inlet means through which liquid reactant can be continuously introduced to said cathodic reaction zone and outlet means through which liquid reaction products can be continuously removed from said cathodic reaction zone.

8. An energy conversion device in accordance with claim 6 which is a secondary battery.

9. An energy conversion device in accordance with claim 6 wherein said anode-reactant is sodium, said cations are sodium ions and said cathodic reactant-electrolyte comprises sodium and sulfur.

10. An energy conversion device in accordance with claim 6 wherein said anode-reactant is sodium and said reaction zone separator comprises sodium beta-alumina.

11. In an electrical circuit for a cell wherein electrical energy is generated electrochemically comprising a molten alkali metal anode-reactant, a cathode spaced apart from said anode, in contact with said cathode an ionically conductive liquid that is electrochemically reactive with said anode-reactant, and conductor means providing means for electron flow between said anode-reactant and said cathode, the improvement in combination therewith consisting of a reactant separator interposed between and in fluid communication with said anode-reactant and said ionically conductive liquid and comprising a solid crystalline electrolyte which completes said circuit and consists essentially of ions of aluminum and oxygen in crystal lattice combination and cations of said alkali metal which migrate in relation to said crystal lattice when a difference of electrical potential is provided between that portion of said solid electrolyte in contact with said alkali metal anode-reactant and that portion of said solid electrolyte in contact with said ionically conductive liquid.

12. An electrical circuit of a cell in accordance with claim 11 wherein said liquid is a mixture of molten sulfur and electrically conductive particulate solids.

13. An electrical circuit of a cell in accordance with claim 11 wherein said alkali metal anode-reactant is sodium and said liquid comprises ions of sulfur and sodium, the sulfur to sodium ratio in said liquid being greater than $Na_2S_3$.

14. In a thermally regenerated primary battery comprising an anode container, a first molten metal within said anode container, a cathode container, a second molten metal electrochemically reactive with said first molten metal within said cathode container, a regeneration unit spaced apart from said anode container and said cathode container and comprising heating means and a liquid separation unit, outlet means from said cathode container in fluid communication with said fluid separation unit, inlet means to said cathode container in fluid communication with said liquid separation unit, and inlet means to said anode container in fluid communication with said liquid separation unit, the improvement in combination therewith comprising a reactant separator between and in fluid communication with said first molten metal and said second molten metal that is impermeable to said first molten metal and said second molten metal, permeable to cations of said first molten metal and comprises a crystalline solid electrolyte consisting essentially of ions of aluminum and oxygen in crystals lattice combination and cations of said first molten metal which migrate in relation to said crystal lattice under influence of an electric field.

15. A thermally regenerated primary battery in accordance with claim 14 wherein said first molten metal is sodium and said second molten metal is tin.

16. A method for generating electrical energy electrochemically which comprises maintaining
(1) an alkali metal anode-reactant and
(2) a cathodic reactant-electrolyte that is
   (a) electrochemically reversibly reactive with cations of said alkali metal and
   (b) in contact with a cathode one opposite sides of and in contact with a solid, half-cell separator that separates said anode-reactant and the anodic half-cell reactions thereof from said cathodic reactant-electrolyte and the cathodic half-cell reactions thereof, said separator comprising a crystalline solid electrolyte that is selectively-ionically-conductive with respect to cations of said alkali metal and consists essentially of ions of aluminum and oxygen in crystal lattice combination and cations of an alkali metal which migrate in relation thereto when a difference of electrical potential is provided between said anode-reactant and said cathode, electrically connecting said anode-reactant and said cathode with a conductor which forms a portion of an electrical circuit and provides means for electron flow between said anode-reactant and said cathode, said electrical circuit being completed by ionic conduction between said anode-reactant and said cathode through said cathodic reactant-electrolyte and said solid electrolyte, and maintaining said anode-reactant and said cathodic reactant-electrolyte at a temperature sufficient to maintain both in molten state and effect said half-cell reactions.

References Cited
UNITED STATES PATENTS

| | | | |
|---|---|---|---|
| 2,102,701 | 12/1937 | Gyuris | 136—83.1 |
| 2,301,021 | 11/1942 | Dalpayrat | 136—83.1 |
| 3,235,407 | 2/1966 | Nicholson et al. | 136—86 |
| 3,260,620 | 7/1966 | Gruber | 136—83 |

WINSTON A. DOUGLAS, *Primary Examiner.*

A. SKAPARS, *Assistant Examiner.*